(12) United States Patent
Alam et al.

(10) Patent No.: US 11,329,894 B2
(45) Date of Patent: May 10, 2022

(54) FRAME-BASED NETWORK CONDITION INDICATOR FOR USER EQUIPMENT INCLUDING FOR 5G OR OTHER NEXT GENERATION USER EQUIPMENT

(71) Applicants: AT&T Intellectual Property I, L.P., Atlanta, GA (US); AT&T Mobility II LLC, Atlanta, GA (US)

(72) Inventors: Iftekhar Alam, Roswell, GA (US); Ming-Ju Ho, Alpharetta, GA (US); Alexander Viox, Atlanta, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 29 days.

(21) Appl. No.: 16/867,038

(22) Filed: May 5, 2020

(65) Prior Publication Data
US 2021/0351991 A1 Nov. 11, 2021

(51) Int. Cl.
| | |
|---|---|
| H04L 12/24 | (2006.01) |
| H04L 12/26 | (2006.01) |
| H04L 12/801 | (2013.01) |
| H04W 24/08 | (2009.01) |
| H04W 28/24 | (2009.01) |
| H04L 41/5009 | (2022.01) |
| H04L 43/067 | (2022.01) |
| H04L 47/11 | (2022.01) |
| H04L 41/5025 | (2022.01) |

(52) U.S. Cl.
CPC ...... *H04L 41/5009* (2013.01); *H04L 41/5025* (2013.01); *H04L 43/067* (2013.01); *H04L 47/11* (2013.01); *H04W 24/08* (2013.01); *H04W 28/24* (2013.01)

(58) Field of Classification Search
None
See application file for complete search history.

(56) References Cited

U.S. PATENT DOCUMENTS

| | | | | |
|---|---|---|---|---|
| 10,439,921 | B1* | 10/2019 | Dubey | H04W 24/08 |
| 2015/0282142 | A1* | 10/2015 | Dahlman | H04W 76/23 370/329 |
| 2018/0023968 | A1* | 1/2018 | Stuchfield | G01C 21/3655 701/416 |
| 2018/0110113 | A1* | 4/2018 | Lin | H04W 4/80 |

(Continued)

*Primary Examiner* — Jay L Vogel
(74) *Attorney, Agent, or Firm* — Amin, Turocy & Watson, LLP

(57) ABSTRACT

The disclosed technology is directed towards a frame-based indicator that can convey current network condition information and the type and quality of service currently available. The frame-based indicator can fit the shape of a user equipment, such as surrounding the display screen. The frame can be used to indicate various network information, including, but not limited to signal power, signal quality, noise, type of band available, network speeds and network latency. Network quality and types of services can be differentiated by frame size, frame pattern, frame color, frame color intensity, frame background gradient, frame flash pattern, frame animation, and so forth. The operating system and application programs can use the frame-based indicator to convey the various network-related information.

19 Claims, 11 Drawing Sheets

(56) References Cited

U.S. PATENT DOCUMENTS

2018/0316570 A1* 11/2018 Marcotte ............ H04L 41/5019
2019/0069229 A1*  2/2019 Lee ..................... H04W 88/06
2020/0322820 A1* 10/2020 Carter ................. H04W 24/10

* cited by examiner

FRAME-BASED NETWORK CONDITION INDICATOR FOR USER EQUIPMENT INCLUDING FOR 5G OR OTHER NEXT GENERATION USER EQUIPMENT

TECHNICAL FIELD

The subject application relates to wireless communications systems in general, and more particularly to conveying network communication-related status data to users.

BACKGROUND

Contemporary wireless communication technologies including Long Term Evolution (LTE) Advanced and Fifth Generation (5G) are introducing new network enhancements and services, including internet of things (IoT), virtual reality (VR) and other real-time applications. The quality of these services can significantly change based on the network conditions (e.g. higher speeds, lower latency) that are available at any given time.

However, network indicators on user equipments (UEs) do not adequately show the network capabilities available to support such services. Currently, the network status or quality indicator typically appears at the top of UE screen and only displays a number of bars (1 to 5) that indicate the signal strength, along with a small icon to indicate the communication technology in use, e.g., 3G, 4G, LTE, 5Ge, 5G or 5G+.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
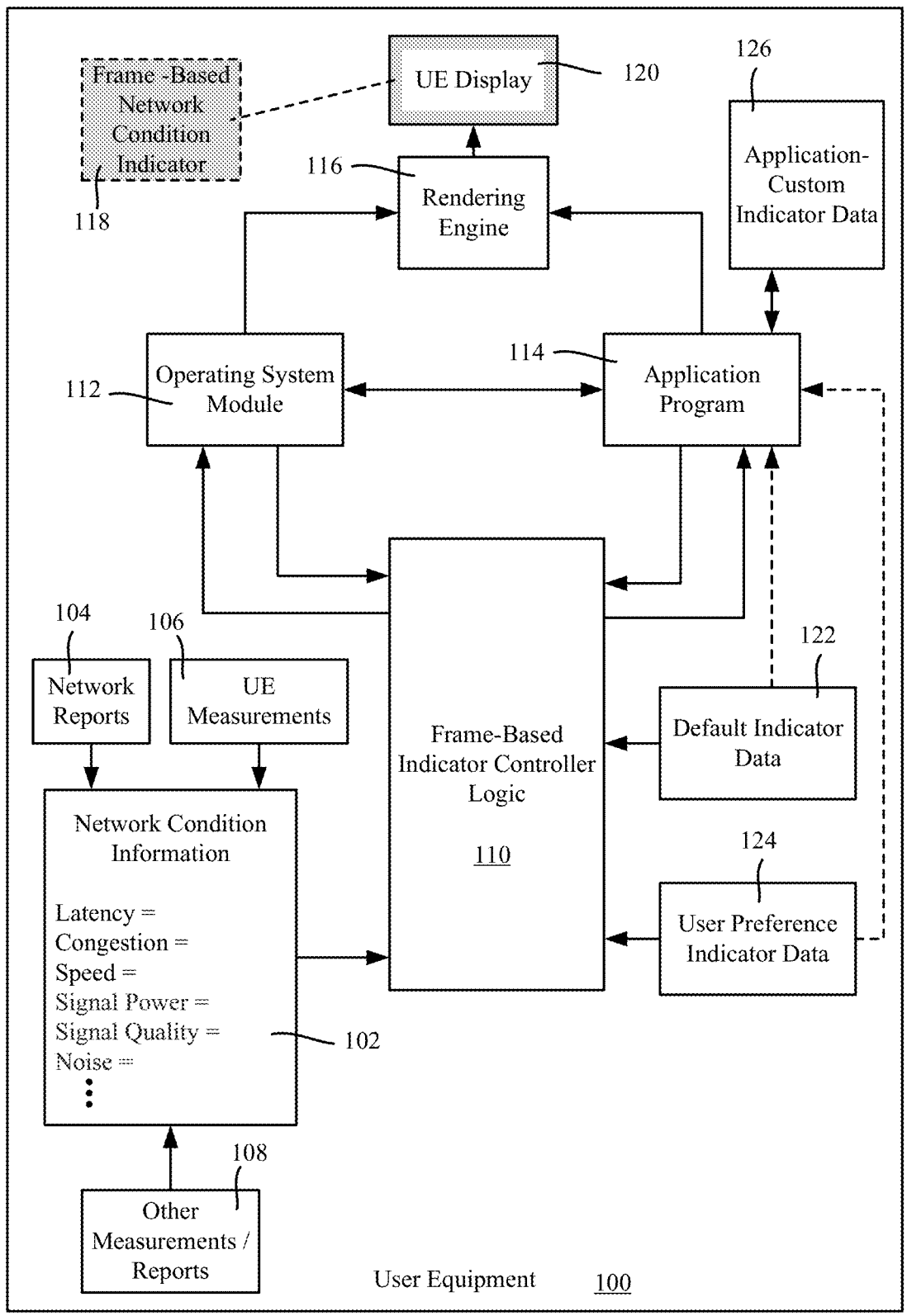
FIG. 1 illustrates an example user equipment configured with a frame-based indicator to present network-related information, in accordance with various aspects and embodiments of the subject disclosure.

The technology described herein is generally directed towards presenting a network indicator on a user equipment, which, from a user's perspective, conveniently conveys the current network conditions, including by displaying information that indicates the type of service and quality of service the user is likely to experience. In one aspect, a frame-based network indicator is provided to augment the limited information (e.g., signal strength bars and technology icon) currently available on user equipments.

As will be understood, the technology described herein provides a dynamic way to show network customers the current network conditions and/or the type and quality of services available, eliminating customer confusion with respect to not knowing what services are available. For example, certain services that a user may wish to invoke can benefit from having more detailed network condition indicators, including to accurately show if a service is available, and/or if a service can operate efficiently and successfully. For example, a UE frame-based indicator as described herein can represent current network capabilities and conditions such as congestion, speed, latency, noise and the like, thereby allowing customers to make informed decisions as to the quality and type of service currently supported by the network. As a more particular example, whether a user has a good or bad experience with respect to playing an interactive streaming video game generally depends on the current latency; a user deciding whether to play such a game can quickly decide whether or not to play based on the current latency conditions as represented in the user equipment's frame-based indicator.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in FIG. 1, a user equipment (UE) 100 obtains network condition information 102, such as by reports 104 obtained via the communication network with which the UE 100 is communicating, UE measurements 106 (e.g., measured latency), and other measurements and/or reports 108, such as data download/upload rates which can be measured based on recent data communications and/or obtained via third party program(s). The network condition information 102 can be obtained as a whole or in appropriate parts thereof on demand and/or on some relatively frequent basis so as to be current or generally current in time.

In the example of FIG. 1, the network condition information 102 is accessed by frame-based indicator controller logic 110. Any of this network condition information 102 can be made available in a suitable format to a requesting program, e.g., via an interface or the like to the frame-based indicator controller logic 110 (or to a container of the network condition information 102), such as called by an operating system module 112 or an application program 114.

As one example, the operating system module 112 can request some portion of the network condition information 102, such as current latency data, to be returned. The network condition information 102 that is returned as network condition data can be numeric values (e.g., the current value as is) or transformed in some way, such as network condition data reformatted as rendering parameter data, e.g., color, pattern, size or the like. Such parameter data can be based on rules that map to default indicator data 114; note that in one or more implementations, some or all of the default indicator data 114 can be overridden by user preference indicator data.

As a more particular example, consider that latency data (e.g., a ping's response time) above some high latency threshold corresponds to a red frame-based indicator, latency below the high latency threshold and above some low latency threshold corresponds to a yellow frame-based indicator, and latency below low latency threshold corresponds to a green frame-based indicator. When queried for latency data, the frame-based indicator controller logic 110 can respond with red, yellow or green by default, or alternatively with a high, medium or low values, such as 3, 2 or 1, respectively. In any event, which component performs the transformation is a design choice; however what gets rendered (via rendering engine 116) on the frame-based network condition indicator 118 of the user equipment display 120 visibly conveys the result to the user.

It should be noted that while default indicator data 122 can be predefined, e.g., to provide a red, yellow or green color scheme to display to indicate the current latency conditions, in one or more implementations user preference indicator data 124 can override at least some of the default parameter data. For example, a color-blind user can override the default color scheme with a different, user-customized color scheme, and so on for other accessibility reasons. As another example, certain flash rates can cause medical issues with some individuals, and such individuals can customize any such flash rate or replace the flash rate with a more static indicator.

Moreover, the scheme for presenting information can be determined by an application program. By way of another example, consider that the application program 114 can request some or all of the network condition information 102 in numeric form or the like (instead of or in addition to having the data returned as transformed data). In this way, the application program 114 can apply its own scheme for representing the network condition information in a custom way (e.g., as represented in FIG. 1 by application-custom indicator data 126). As a more particular example, a browser program can request current download speed information, and using application-custom indicator parameter data 120 can process the current (numeric) network speed data into visible rendering data. The representation of the speed can be done in various ways, including by animation; for example a brightened portion or symbol (e.g., a down arrow symbol for download, an up arrow for upload) can be animated to go around the frame-based indicator at a rate that is generally proportional to the current download rate.

Figure 2:
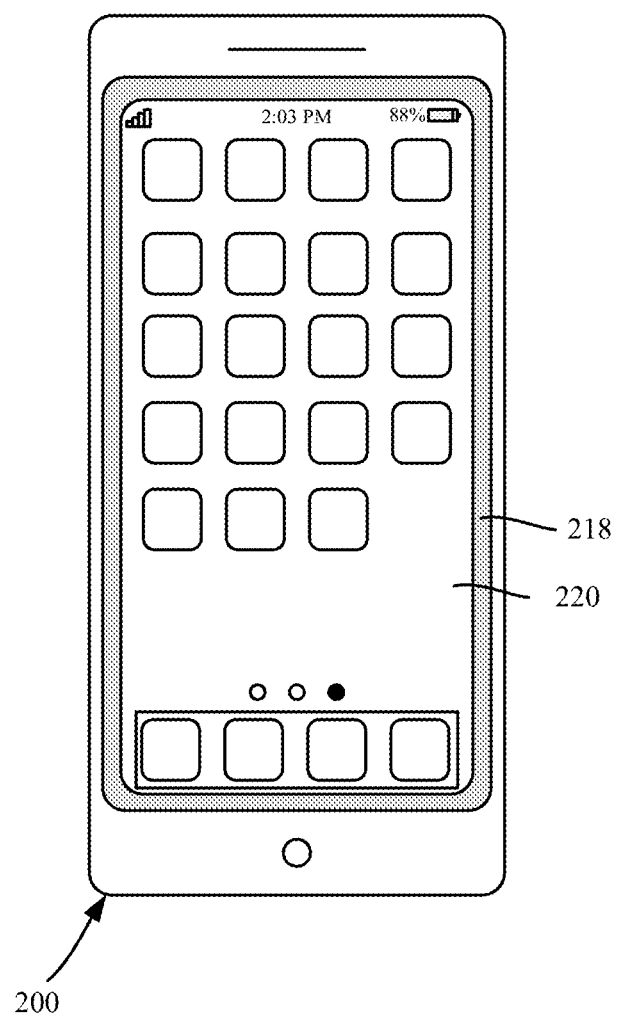
FIGS. 2-4 illustrate various examples of user equipments with frame-based indicators conveying network-related information, in accordance with various aspects and embodiments of the subject disclosure.

FIG. 2 shows an example of how a frame-based indicator 218 can be provided on a display screen 220 of a user equipment 200 such as a smartphone, tablet or the like. Because space is limited at the top of the UE screen, the dynamic frame-based indicator 218 (which can be in addition to the signal strength and technology icon currently available) is provided. In general, the frame wraps around (e.g., borders, surrounds, encircles etc.) the main content portion of the display screen, at least in part. As can be readily understood, the size, color, intensity and so on of the frame-based indicator 218 can be used to indicate the various network capabilities and services.

As in the example above, the color of the frame can be used to show network latency, which significantly impacts augmented reality (AR), virtual reality (VR) and gaming applications, e.g., the color of the frame (Red-Yellow-Green) can indicate the latency quality. As also described above, a vendor can define default thresholds and rulesets for the frame-based indicator 218, and/or thresholds and/or rulesets can also be based on crowd-sourced data, at least in part. The frame-based indicator 218 can time out, such as a few seconds after the display screen first lights up, and/or can also alternate to convey different types of information as described herein. A user can manually turn a frame-based indicator on or off, including temporarily (such as by interaction with the display/touchscreen device or by verbal command) or as a semi-permanent device setting.

To summarize, one advantage of a frame-based indicator is to show network latency. Note that network latency significantly impacts multiple 5G use cases, including augmented reality (AR), virtual reality (VR), gaming and other real-time applications, yet there is no known contemporary UE indicator today that shows latency. A network demands relatively low latency to support such applications, and the frame-based indicator described herein provides a convenient way for users to know if the network will support a program/service and/or what quality of service can be expected.

Figure 3:
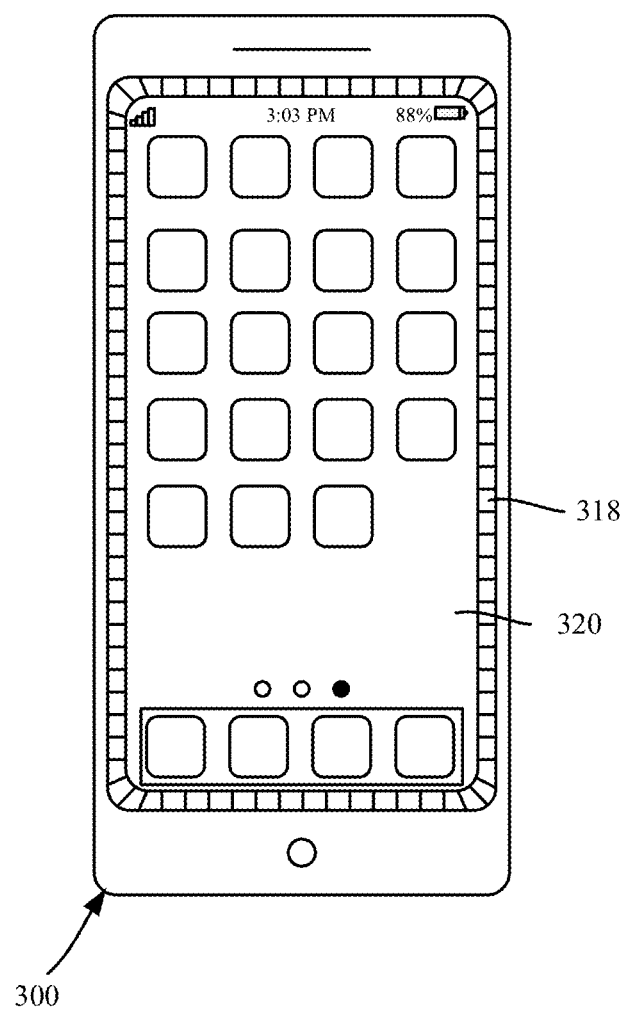

As shown in FIG. 3, in addition to (or instead of) color, different patterns and the like can be used to convey network condition information. This can help users avoid confusion; in the above examples solid colors can be used to convey latency, and animation can be used to convey download (or upload) speed, which users can get used to. As one example, signal quality can also use color, but with a different background pattern (or possibly a color gradient) so users can easily differentiate between when latency versus signal quality is being represented.

The frame-based network indicator can alternate over time to indicate different types of network condition information. For example, particularly if the main selection screen is being presented, the frame-based network indicator can convey latency conditions for a few seconds, followed by download speed for a few seconds, followed by signal quality, and so on.

Figure 4:
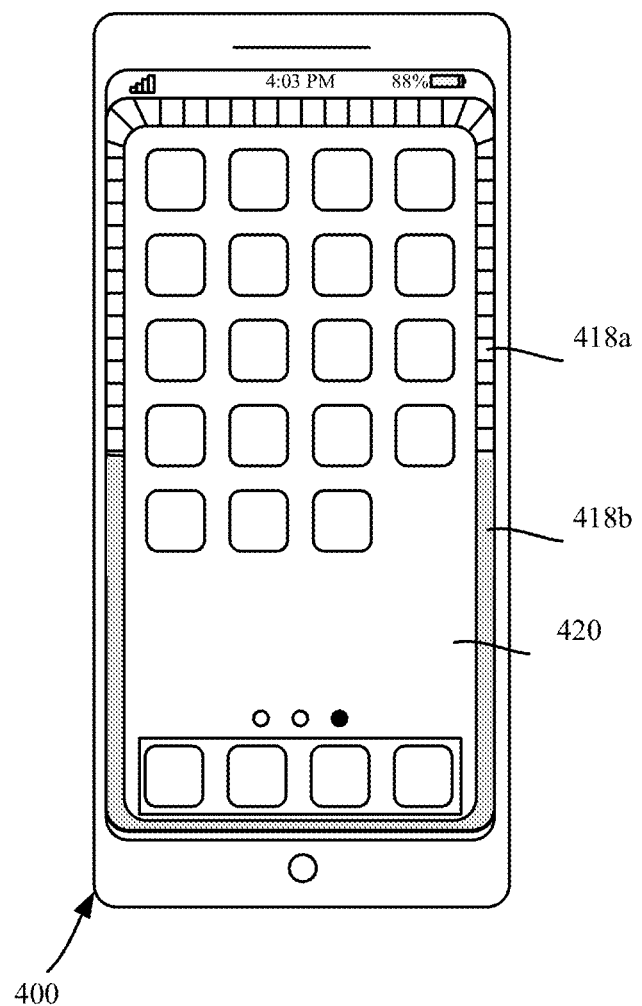

Further, as shown in FIG. 4, a frame-based network indicator can have two or more parts, such as an upper part 418*a* and a lower part 418*b*. This allows an application program, for example, to simultaneously (instead of alternating) convey two or more pieces of network condition information that may be relevant to that application program's perceived performance. A multi-part frame-based network indicator can also alternate (in time) one or more of its parts with other network condition information displays.

It should be noted that FIG. 4 also exemplifies an alternative embodiment, (one which is not necessarily tied to a multi-part frame-based network indicator). In FIG. 4, it can be seen that the traditional signal bars, current time and battery charge status (as well as any other such icons that tend to always be present) are shown as outside of the frame-based network indicator. Thus, it should be understood that although not explicitly shown, the frame based indicator in the examples of FIGS. 2 and 3 can similarly wrap around at least part of the main display area without encompassing such traditional icons, or the frame based indicator of FIG. 4 can encompass such traditional icons, whether or not being a multi-part frame.

Figure 5A:
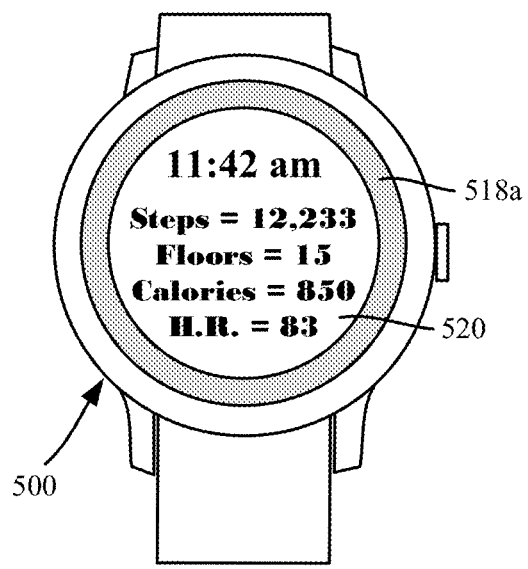
FIGS. 5A and 5B are example representations of wearable user equipments with the thickness of a frame-based indicator conveying network-related information, in accordance with various aspects and embodiments of the subject disclosure.
Figure 5B:
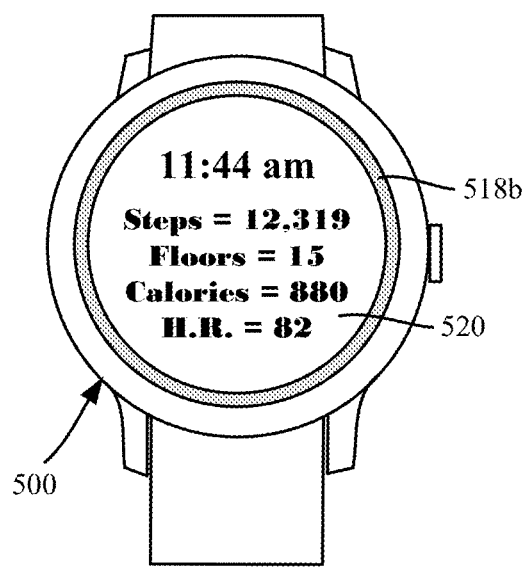

FIGS. 5A and 5B show a different type of user equipment, which in this example is a wearable fitness type device 500 with a display 520. In this example, the thickness of the frame-based network indicator conveys the network condition information, e.g., network congestion. In a first instance, congestion is high, whereby the frame-based network indicator 518*a* is displayed as a relatively thick ring around the inner portion of the display 520. In a second instance, congestion is lower, whereby the frame-based network indicator 518*b* is displayed as a relatively thin ring around the inner portion of the display 520. Note that relative thicknesses of a frame-based network indicator are not limited to conveying congestion data.

As is understood, the thickness of a frame-based network indicator can be varied with any type of user equipment, such as the user device 200 of the type exemplified in FIG. 2. For example, during an event, the network in a venue can get very congested. The UE conventionally may show full bars on LTE or 5G, but the user may still have a hard time accessing the network, which causes user frustration or worse. Indeed, the user can expect to experience a great network performance based on the signal strength, but in reality the experience is the opposite. Thus, while the signal strength indicator cannot relay the network congestion status to the user, this can be done by a frame-based indicator that more accurately describes a user's expectations with respect to a network experience; that is, when congested the user can understand that some accessibility issues and/or dropped calls may be experienced.

Figure 6A:
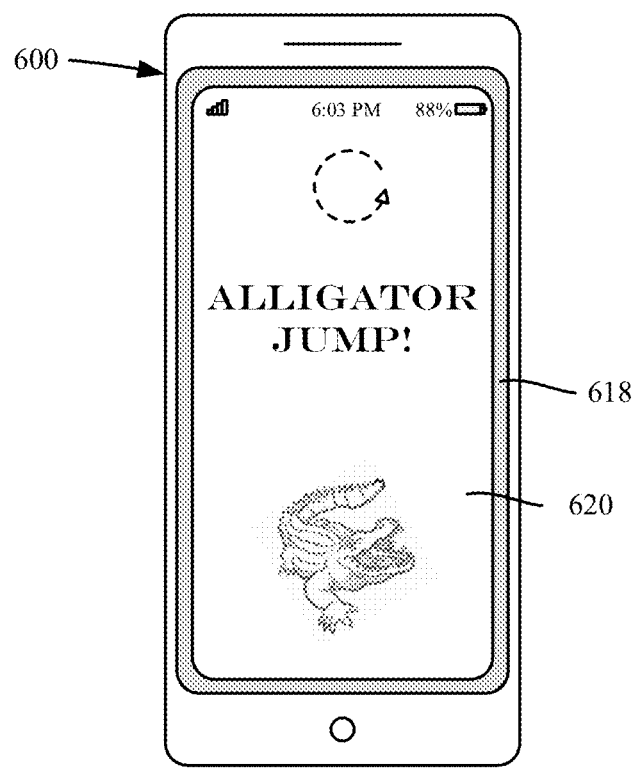
FIGS. 6A and 6B are example representations of a user equipment conveying network-related information via a frame-based indicator while an application program is loading (FIG. 6A), and operating without the frame-based indicator while the application program is running (FIG. 6B), in accordance with various aspects and embodiments of the subject disclosure.
Figure 6B:
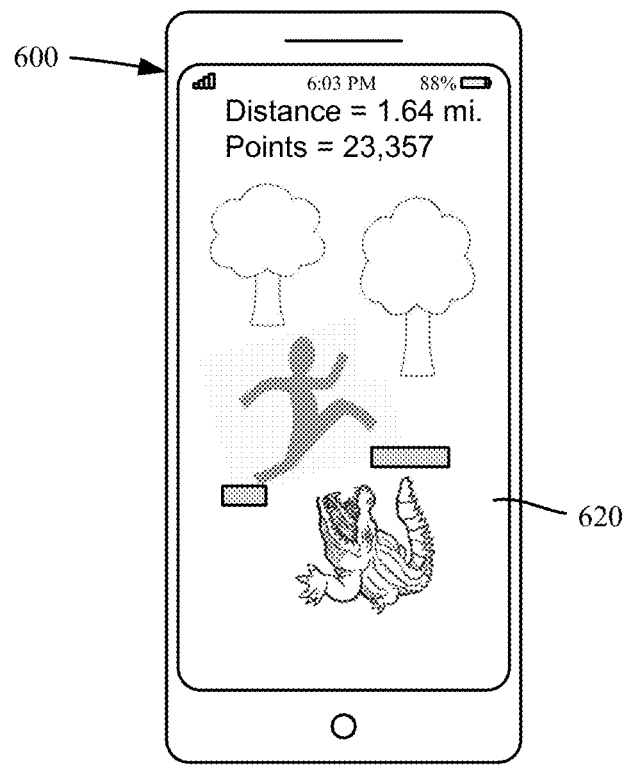

Turning to another aspect, a frame-based network indicator can be temporary, such as controlled by an application program. By way of example, FIG. 6A shows a frame-based network indicator 618 that conveys network condition information while an application program (e.g. an interactive streaming game) is loading. Once the game play starts the application program turns off the frame-based network indicator (FIG. 6B) so that the full display 620 is available for playing the game. Note that the application program can re-render the frame-based network indicator 618 at any time, such as if the latency suddenly increases and the application program wants to let the user know that it is the network conditions rather than the game itself that is possibly problematic. A configurable time period can be set, e.g., for an actual amount time or a time period corresponding to an event, e.g., the time period for which the frame-based network indicator ends when the game play starts. The frame-based network indicator can be animated out, e.g., the main portion of the display can grow as the frame-based network indicator shrinks, the frame-based network indicator can blink a few times and the disappear, the frame-based network indicator can gradually fade out, and so on.

Figure 7:
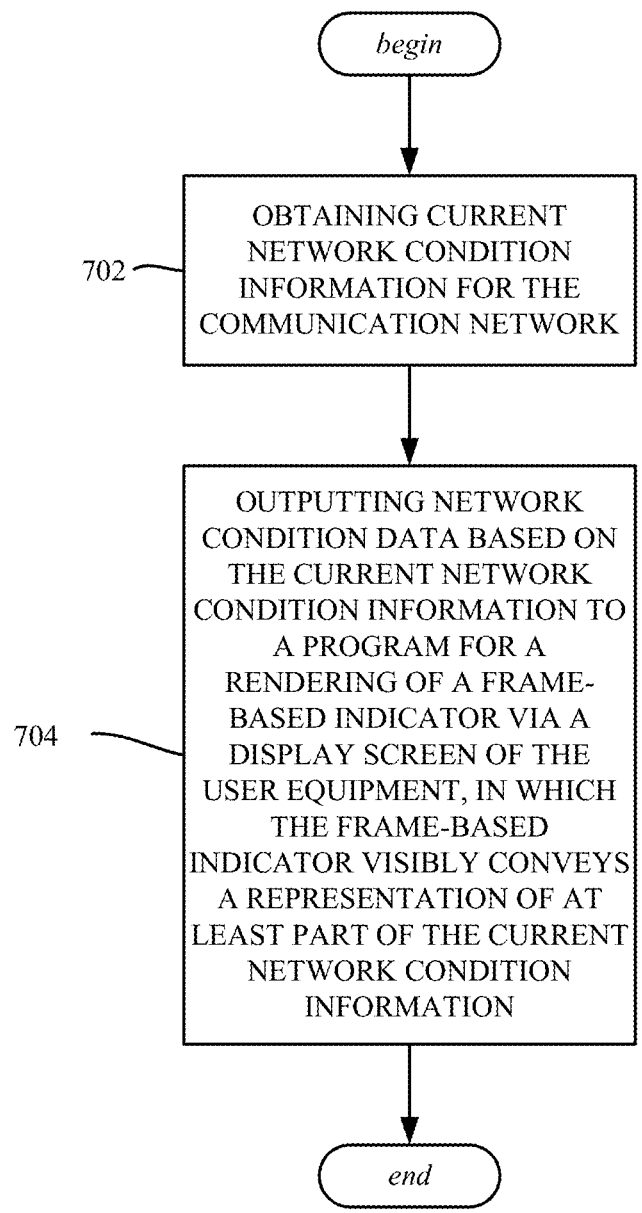
FIG. 7 illustrates example operations of a user equipment to convey network-related information via a frame-based indicator, in accordance with various aspects and embodiments of the subject disclosure.

One or more example aspects are represented in FIG. 7, and can correspond to a user equipment, comprising a processor, and a memory that stores executable instructions that, when executed by the processor of the user equipment of a communications network, facilitate performance of operations. Operation 702 represents obtaining current network condition information for the communication network. Operation 704 represents outputting network condition data based on the current network condition information to a program for a rendering of a frame-based indicator via a display screen of the user equipment, in which the frame-based indicator visibly conveys a representation of at least part of the current network condition information.

Further operations can include obtaining updated communication network condition information, and outputting updated network condition data based on the updated network condition information to the program to render an updated frame-based indicator on the display screen of the user equipment.

Outputting the network condition data can include transforming at least some of the current network condition information into the network condition data.

The program can be an application program, and outputting can include returning the network condition data to the application program in response to a request from the application program.

The user equipment can be a fifth generation (5G) device, the communication network can be a 5G network, and the program can include an operating system module running on the 5G device.

Obtaining the current network condition information can include obtaining the current network condition information based on a measurement made by the user equipment.

Obtaining can include obtaining the current network condition information by at least one of: receiving the current network condition information at the user equipment via the communication network, or receiving the current network condition information as crowd-sourced information at the user equipment via the communication network.

The current network condition information can include at least one of: signal power information, signal quality information, noise information, type of available band information, network speed information, network congestion information or network latency information.

The frame-based indicator can visibly convey the representation of the current network condition information via appearance information, which can include at least one of: frame size, frame thickness, frame texture pattern, frame color, frame color intensity, frame opacity, frame shadow, frame background gradient, frame flashing rate, frame flashing pattern, or frame animation.

At least part of the appearance information can be user customizable.

The frame-based indicator can temporarily convey the representation of the current network condition information for a configurable time period. The frame-based indicator can wrap around at least part of the display screen.

Figure 8:
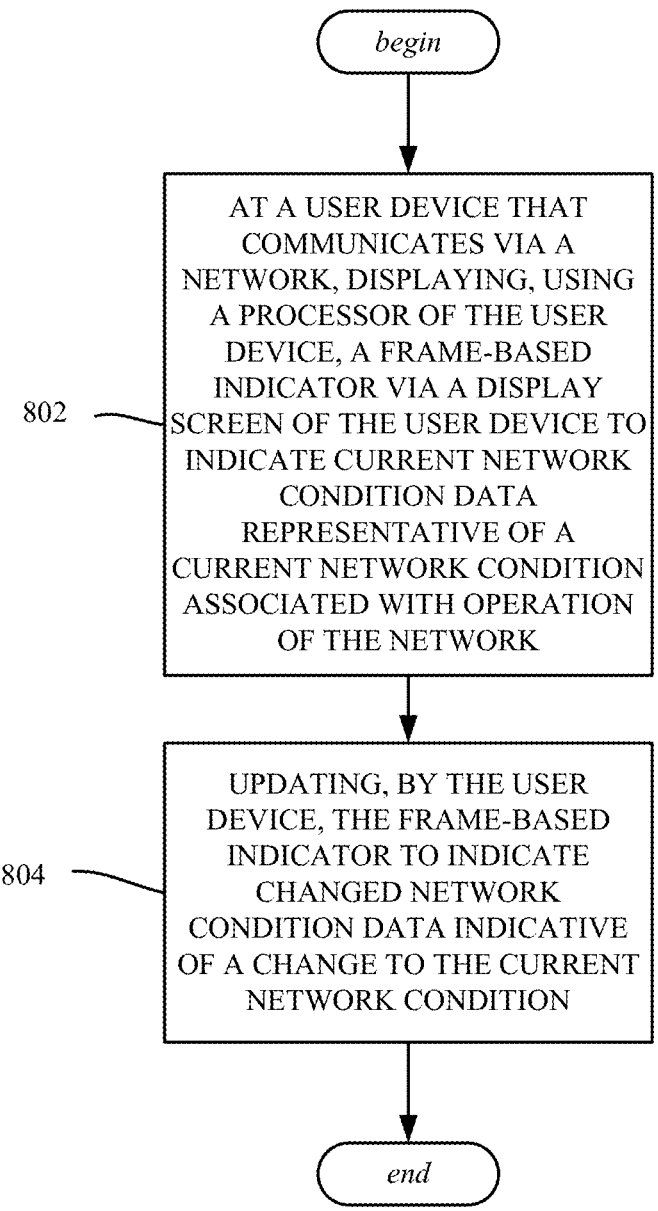
FIG. 8 illustrates example operations of a user equipment to convey and update network-related information via a frame-based indicator, in accordance with various aspects and embodiments of the subject disclosure.

One or more example aspects are represented in FIG. 8, and can correspond to operations of a method. Operation 802 represents, at a user device that communicates via a network, displaying, using a processor of the user device, a frame-based indicator via a display screen of the user device to indicate current network condition data representative of a current network condition associated with operation of the network. Operation 804 represents updating, by the user device, the frame-based indicator to indicate changed network condition data indicative of a change to the current network condition.

Displaying the frame-based indicator can include indicating at least one of: signal power, signal quality, noise, type of band available, network speed, network congestion or network latency.

Aspects can include selecting, by the user device, the current network condition data based on an output from an application program.

Updating the frame-based indicator can include visibly modifying at least one of: frame size, frame thickness, frame texture pattern, frame color, frame color intensity, frame opacity, frame shadow, frame background gradient, frame flashing rate, frame flashing pattern, or frame animation.

Aspects can include measuring, by the user device, the current network condition data at the user device. Aspects can include receiving, by the user device, the current network condition data at the user device via the network.

Figure 9:
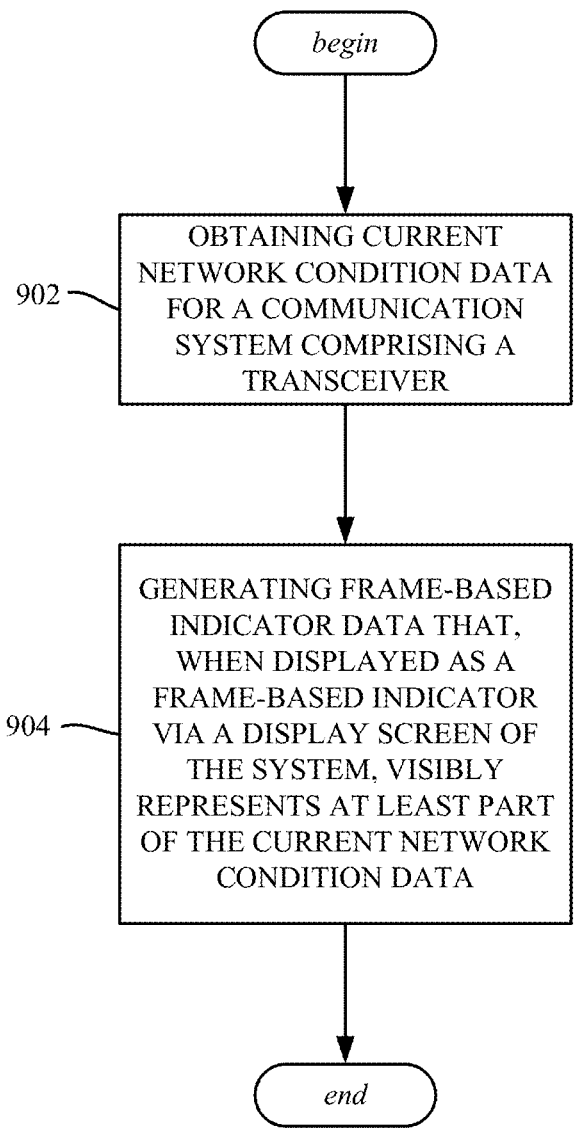
FIG. 9 illustrates example operations of a device that generates frame-based indicator data to visibly represent network condition data, in accordance with various aspects and embodiments of the subject disclosure.

One or more aspects are represented in FIG. 9, such as implemented in a machine-readable storage medium, comprising executable instructions that, when executed by a processor of a communication system comprising a transceiver, facilitate performance of operations. Example operation 902 represents obtaining current network condition data for the communication system. Operation 904 represents generating frame-based indicator data that, when displayed as a frame-based indicator via a display screen of the system, visibly represents at least part of the current network condition data.

Further operations can include, in response to obtaining updated network condition data for the communication system, generating an updated frame-based indicator.

Further operations can include, as part of providing the frame-based indicator to the system for display via the display screen, outputting parameter data for consumption by a program that generates rendering data usable to render a visible representation of the frame-based indicator.

As can be seen, the use of a frame-based indicator can convey valuable information to a user, by relaying the network conditions and the type and quality of service available. This helps users set more accurate expectations leading to an improved experience. A frame-based indicator can be appealing given contemporary device screen resolution. The frame can fit the shape of the UE.

The frame can be used to indicate various network information, including, but not limited to signal power, signal quality, noise, type of band available (e.g., mmWave, Licensed Assisted Access or LAA, large Bandwidth), network speeds and network latency. Network quality and types of services can be indicated by the following (non-limiting) mechanisms: frame size or type (solid, dashed, etc.), frame color, frame color intensity, frame background gradient, frame flash pattern, frame animation, and so forth.

The service provider and/or device vendor can define thresholds and rulesets for the frame. For example, for latency, frame color can be chosen with Red-Yellow-Green thresholds set in the rules. An application program also can decide what information to show on the frame-based indicator, and how it should be presented. As new services and/or features are introduced, the service provider and/or device vendor can quickly customize the frame-based network indicator solution to showcase those new services and features.

The indicator can also be based on crowd sourced data in that area. For example, speed data can be used for speed indicator, whereas other data can be used to indicate signal power, quality, noise, etc. The solution can be customized based on the service or network requests or requirements and transformed into an indicator that the customer can easily understand. This allows users to know if a service is available in an area and/or the quality of service available. This indicator can be turned ON/OFF by the user as desired.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 10:
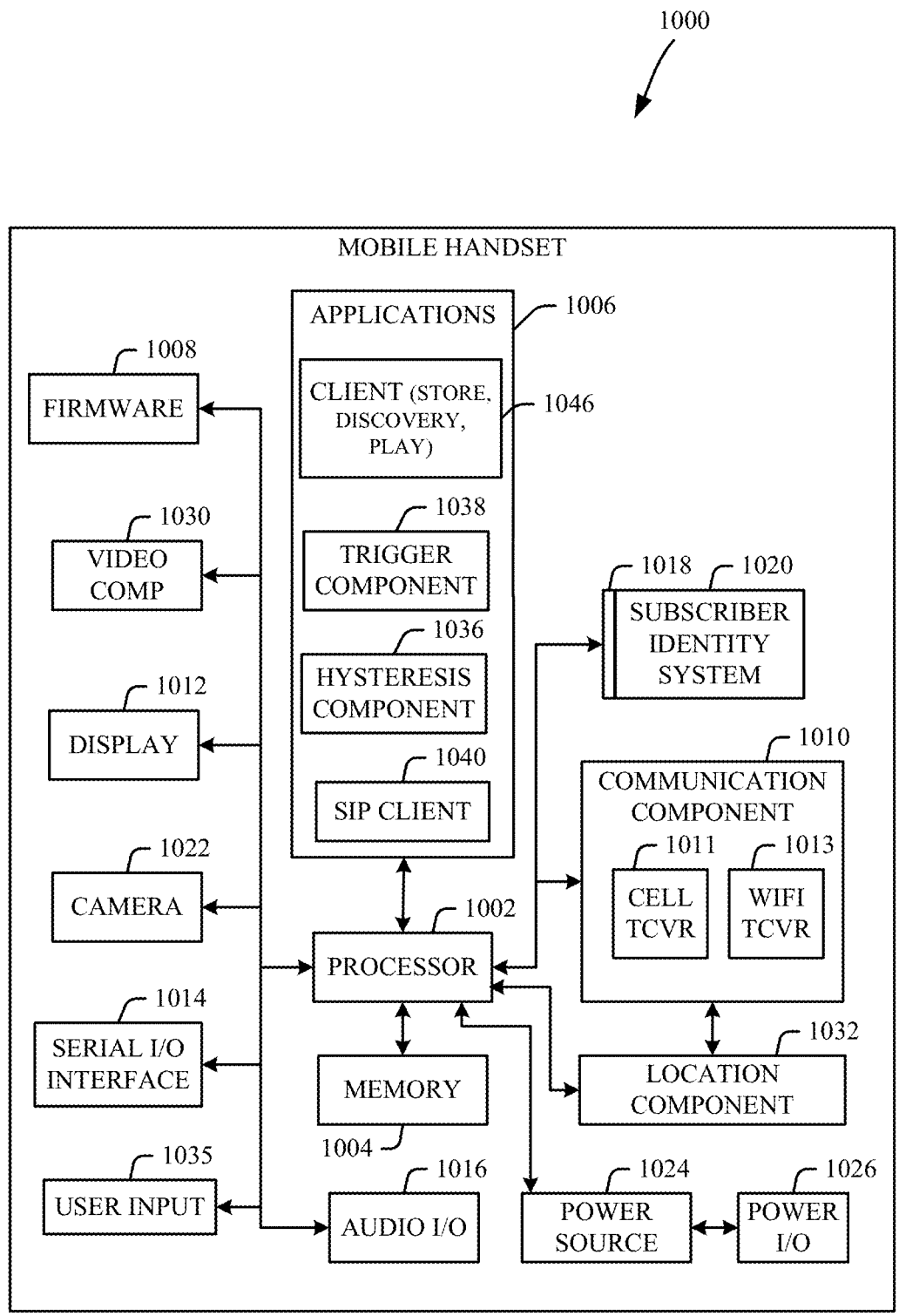
FIG. 10 illustrates an example block diagram of an example mobile handset operable to engage in a system architecture that facilitates wireless communications according to one or more embodiments described herein.

Referring now to FIG. 10, illustrated is a schematic block diagram of an example end-user device such as a user equipment) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000.

As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 810, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
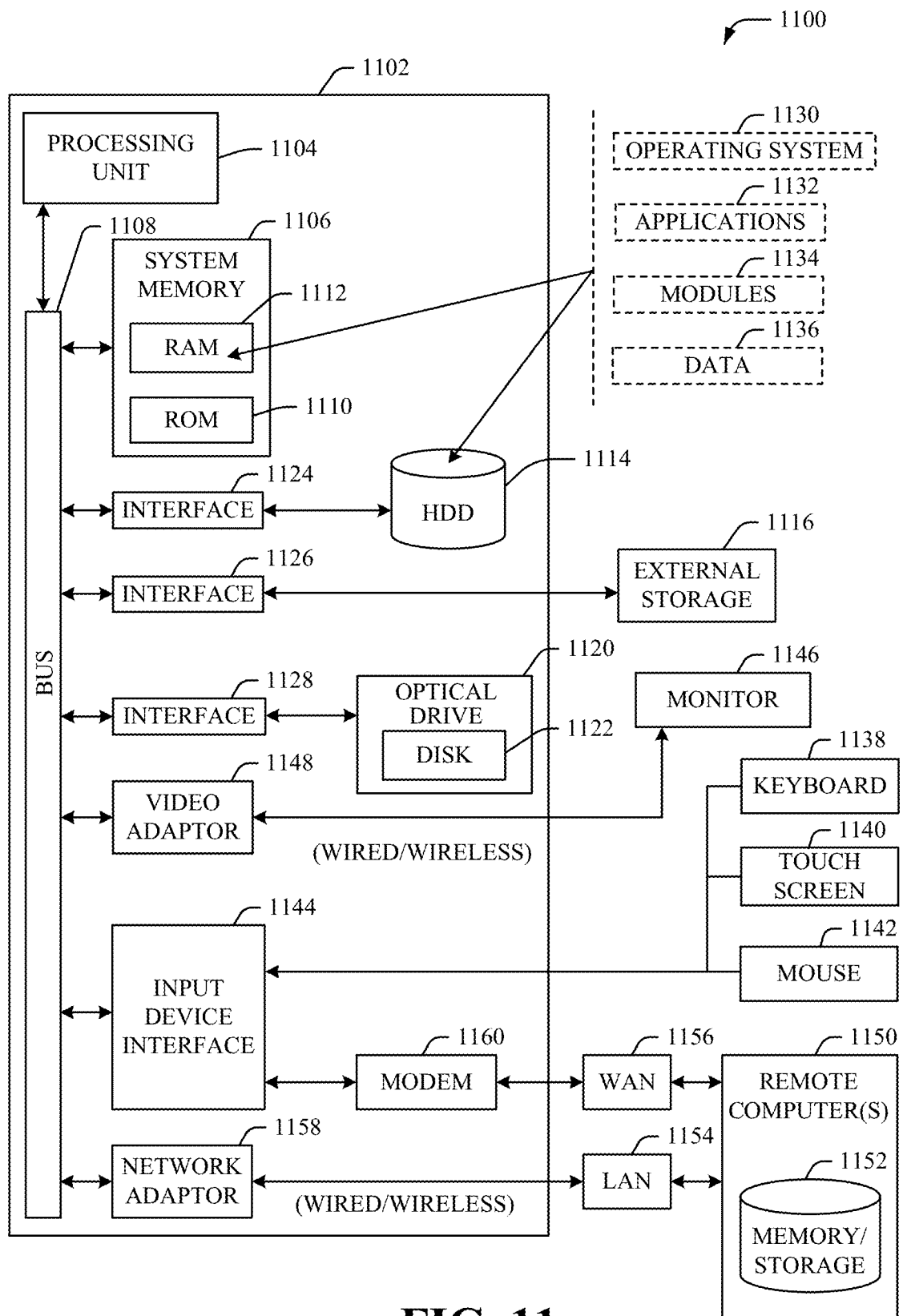
FIG. 11 illustrates an example block diagram of an example computer/machine system operable to engage in a system architecture that facilitates wireless communications according to one or more embodiments described herein.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD), non-volatile memory and other storage technology could be used in addition to, or in place of, an HDD 1114, and can be internal or external. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally include emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can include one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, stand-alone, executable packages of software that include, e.g., code, runtime, system tools, system libraries and settings for an application.

Further, computer 1102 can be enabled with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 11 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A user equipment, comprising:
   a processor; and
   a memory that stores executable instructions which, when executed by the processor of the user equipment subscribed to a communication network, facilitate performance of operations, the operations comprising:
   obtaining current network condition information for the communication network; and
   outputting network condition data based on the current network condition information to a program for a rendering of a frame-based indicator via a display screen of the user equipment, in which the frame-based indicator visibly conveys a representation of at least part of the current network condition information relating to the program, wherein the display screen comprises a rectangular shape, the frame-based indicator comprises a first display area that wraps continuously around at least three sides of a border of the display screen and surrounds a portion of a second display area of the display screen that does not convey the representation of at least the part of the current network condition information relating to the program, and different portions of the frame-based indicator indicate different parts of the current network condition information using different display formats.

2. The user equipment of claim 1, wherein the operations further comprise obtaining updated network condition information, and outputting updated network condition data based on the updated network condition information to the program to render an updated frame-based indicator on the display screen of the user equipment.

3. The user equipment of claim 1, wherein the outputting comprises transforming at least some of the current network condition information into the network condition data.

4. The user equipment of claim 1, wherein the program comprises an application program, and wherein the outputting comprises returning the network condition data to the application program in response to a request from the application program.

5. The user equipment of claim 1, wherein the user equipment is a fifth generation (5G) device, wherein the communication network is a 5G network, and wherein the program comprises an operating system module running on the 5G device.

6. The user equipment of claim 1, wherein the obtaining comprises obtaining the current network condition information based on a measurement made by the user equipment.

7. The user equipment of claim 1, wherein the obtaining comprises obtaining the current network condition information by at least one of: receiving the current network condition information at the user equipment via the communication network, or receiving the current network condition information as crowd-sourced information at the user equipment via the communication network.

8. The user equipment of claim 1, wherein the current network condition information comprises at least one of: signal power information, signal quality information, noise information, type of available band information, network speed information, network congestion information or network latency information.

9. The user equipment of claim 1, wherein the different formats differ in characteristics comprising at least one of: frame size, frame thickness, frame texture pattern, frame color, frame color intensity, frame opacity, frame shadow, frame background gradient, frame flashing rate, frame flashing pattern, or frame animation.

10. The user equipment of claim 9, wherein at least part of the appearance information is user customizable.

11. The user equipment of claim 1, wherein the frame-based indicator temporarily conveys the representation of at least the part of the current network condition information for a configurable time period.

12. A method, comprising:
displaying, by a user equipment comprising a processor, a frame-based indicator via a display screen of the user equipment to indicate current network condition data representative of a current network condition associated with operation of a network, wherein the display screen comprises a rectangular shape, the frame-based indicator comprises a first display region that wraps continuously around at least three sides of a border of the display screen and surrounds a portion of a second display region of the display screen that does not indicate the current network condition data representative of the current network condition, and different areas of the frame-based indicator indicate different characteristics of the current network condition using different display formats; and
updating, by the user equipment, the frame-based indicator to indicate changed network condition data indicative of a change to the current network condition.

13. The method of claim 12, wherein the different characteristics comprise at least one of: signal power, signal quality, noise, type of band available, network speed, network congestion or network latency.

14. The method of claim 12, further comprising selecting, by the user equipment, the current network condition data based on an output from an application program.

15. The method of claim 12, wherein the different display formats differ in display parameters comprising at least one of: frame size, frame thickness, frame texture pattern, frame color, frame color intensity, frame opacity, frame shadow, frame background gradient, frame flashing rate, frame flashing pattern, or frame animation.

16. The method of claim 12, further comprising at least one of: measuring, by the user equipment, the current network condition data at the user equipment, or receiving, by the user equipment, the current network condition data at the user equipment via the network.

17. A non-transitory machine-readable medium, comprising executable instructions that, when executed by a processor of a communication device, facilitate performance of operations, the operations comprising:
obtaining current network condition data for the communication device; and
displaying frame-based indicator data via a frame-based indicator on a display screen of the communication device, that visibly represents at least part of the current network condition data, wherein the display screen comprises a rectangular shape, the frame-based indicator comprises a first display section that wraps continuously around at least three sides of a border of the display screen and surrounds a portion of a second display section of the display screen that does not visibly represent at least the part of the current network condition data, and different zones of the frame-based indicator indicate different parts of the current network condition data using different display formats.

18. The non-transitory machine-readable medium of claim 17, wherein the operations further comprise, in response to obtaining updated network condition data for the communication device, generating an updated frame-based indicator.

19. The non-transitory machine-readable medium of claim 17, wherein the operations further comprise outputting parameter data for consumption by a program that generates rendering data usable to render the frame-based indicator.

* * * * *